(12) United States Patent
Krishnamurthy et al.

(10) Patent No.: US 8,892,762 B2
(45) Date of Patent: Nov. 18, 2014

(54) MULTI-GRANULAR STREAM PROCESSING

(75) Inventors: Rajaram B. Krishnamurthy, Wappingers Falls, NY (US); Carl J. Parris, Rhinebeck, NY (US); Charles Boice, Endicott, NY (US); Lurng-Kuo Liu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 12/637,972

(22) Filed: Dec. 15, 2009

(65) Prior Publication Data

US 2011/0145429 A1    Jun. 16, 2011

(51) Int. Cl.
*G06F 15/16* (2006.01)
*G06F 9/50* (2006.01)
*H04L 29/06* (2006.01)

(52) U.S. Cl.
CPC ............ *G06F 9/5044* (2013.01); *H04L 65/605* (2013.01)
USPC ....................................................... 709/231

(58) Field of Classification Search
None
See application file for complete search history.

(56) References Cited

U.S. PATENT DOCUMENTS

| | | | |
|---|---|---|---|
| 4,636,947 A | 1/1987 | Ward | |
| 5,526,409 A | 6/1996 | Conrow et al. | |
| 5,533,204 A | 7/1996 | Tipley | |
| 6,407,680 B1 * | 6/2002 | Lai et al. | 341/50 |
| 6,647,381 B1 | 11/2003 | Li et al. | |
| 6,704,861 B1 | 3/2004 | McKeen et al. | |
| 6,813,251 B1 | 11/2004 | Garney et al. | |
| 7,096,003 B2 | 8/2006 | Joao et al. | |
| 7,159,233 B2 * | 1/2007 | Son et al. | 725/86 |
| 7,296,263 B1 * | 11/2007 | Jacob | 717/143 |
| 7,353,299 B2 * | 4/2008 | Hattrup et al. | 710/30 |
| 7,478,400 B1 | 1/2009 | Banerjee et al. | |
| 7,505,686 B2 | 3/2009 | Jennen | |
| 7,574,405 B2 | 8/2009 | Rallo et al. | |
| 7,609,652 B2 * | 10/2009 | Kellerer et al. | 370/252 |
| 7,681,015 B2 | 3/2010 | Busck et al. | |
| 7,743,161 B2 * | 6/2010 | Dey et al. | 709/231 |
| 7,797,720 B2 * | 9/2010 | Gopalakrishnan et al. | 725/88 |
| 8,108,234 B2 | 1/2012 | Suenbuel et al. | |
| 8,170,928 B2 | 5/2012 | Knowles et al. | |

(Continued)

FOREIGN PATENT DOCUMENTS

CN    1232068 C    12/2005
CN    1232086 C    12/2005

(Continued)

OTHER PUBLICATIONS

Office Action for U.S. Appl. No. 12/637,951 dated Feb. 4, 2013.

(Continued)

*Primary Examiner* — Brian P Whipple
(74) *Attorney, Agent, or Firm* — Steven Chiu, Esq.; Blanche E. Schiller, Esq.; Heslin Rothenberg Farley & Mesiti P.C.

(57) ABSTRACT

Stream processing is facilitated by distributing responsibility for processing the stream to multiple components of a computing environment. A programmable unit receives one or more streams and determines the operations to be performed for the one or more streams and which components of the computing environment are to perform those operations. It forwards data relating to the one or more streams to one or more components of the computing environment for processing and/or information purposes.

20 Claims, 6 Drawing Sheets

(56) References Cited

U.S. PATENT DOCUMENTS

| | | | |
|---|---|---|---|
| 8,209,375 B2* | 6/2012 | Gormish et al. | 709/203 |
| 2001/0056445 A1 | 12/2001 | Meystel et al. | |
| 2002/0138376 A1 | 9/2002 | Hinkle | |
| 2003/0191805 A1* | 10/2003 | Seymour et al. | 709/204 |
| 2003/0195940 A1* | 10/2003 | Basu et al. | 709/213 |
| 2004/0039691 A1 | 2/2004 | Barratt et al. | |
| 2004/0205199 A1* | 10/2004 | Gormish | 709/229 |
| 2004/0243643 A1* | 12/2004 | Hattrup et al. | 707/200 |
| 2005/0021806 A1* | 1/2005 | Richardson et al. | 709/231 |
| 2005/0209957 A1 | 9/2005 | Kasiviswanathan et al. | |
| 2006/0090009 A1* | 4/2006 | Gopalakrishnan et al. | 709/246 |
| 2006/0123467 A1 | 6/2006 | Kumar et al. | |
| 2006/0259627 A1* | 11/2006 | Kellerer et al. | 709/227 |
| 2006/0294239 A1 | 12/2006 | Ishida | |
| 2007/0180496 A1 | 8/2007 | Fransdonk | |
| 2008/0082647 A1 | 4/2008 | Baker | |
| 2008/0086570 A1* | 4/2008 | Dey et al. | 709/231 |
| 2008/0133741 A1 | 6/2008 | Kubota | |
| 2008/0162881 A1 | 7/2008 | Welc et al. | |
| 2008/0184011 A1 | 7/2008 | Busck et al. | |
| 2009/0028142 A1 | 1/2009 | Schmidt et al. | |
| 2009/0055473 A1* | 2/2009 | Synnergren | 709/204 |
| 2009/0217266 A1 | 8/2009 | Krishnamurthy et al. | |
| 2009/0262749 A1* | 10/2009 | Graumann et al. | 370/412 |
| 2009/0271262 A1 | 10/2009 | Hammad | |
| 2010/0281142 A1* | 11/2010 | Stoyanov | 709/221 |
| 2011/0126275 A1 | 5/2011 | Anderson et al. | |
| 2011/0137795 A1 | 6/2011 | Nambiar et al. | |
| 2011/0145318 A1 | 6/2011 | Krishnamurthy et al. | |
| 2011/0145366 A1 | 6/2011 | Krishnamurthy et al. | |
| 2011/0145429 A1 | 6/2011 | Krishnamurthy et al. | |
| 2012/0278384 A1 | 11/2012 | Synnergren et al. | |

FOREIGN PATENT DOCUMENTS

| | | |
|---|---|---|
| CN | 101308468 A | 11/2008 |
| JP | 2000353066 A | 12/2000 |
| JP | 2005505214 A | 2/2005 |
| JP | 2006146951 A | 6/2006 |
| JP | 2008197783 A | 8/2008 |
| WO | 2008092883 A3 | 8/2008 |
| WO | WO2008092883 A3 | 8/2008 |

OTHER PUBLICATIONS

Final Office Action for U.S. Appl. No. 12/637,951 dated Aug. 28, 2013, pp. 1-12.

International Search Report and Written Opinion for PCT/EP2010/068205 dated Mar. 18, 2011.

Office Action for U.S. Appl. No. 121637,962 dated Sep. 6, 2011.

Redlich, J.P. et al., "Virtual Networks in the Internet," Open Architectures and Network Programming Proceedings, Mar. 1999, pp. 108-114.

Final Office Action for U.S. Appl. No. 12/637,962 dated Apr. 30, 2012.

Office Action for U.S. Appl. No. 12/637,972 dated May 12, 2011, pp. 1-12.

"z/Architecture—Principles of Operation," IBM Publication No. SA22-7832-07, Feb. 2009, pp. 1-1344.

Reddy, P. and Kitsuregawa, M. et al., "Speculative Transaction Processing Approach for Database Systems," IEIC Technical Report, vol. 98, No. 487, pp. 11-18. (Abstract Only), 1998 (no further date information available).

International Search Report and Written Opinion for PCT/EP2011/068205 dated Mar. 18, 2011, pp. 1-11.

Notice of Allowance for U.S. Appl. No. 12/637,951 dated Dec. 23, 2013, pp. 1-14.

z/Architecture Principles of Operation, IBM Publication No. SA22-7832-07, Feb. 2009.

Reddy, P. and Kitsuregawa M., "Speculative Transaction Processing Approach for Database Systems," IEIC Technical Report, vol. 98, No. 487, pp. 11-18. (Abstract Only).

\* cited by examiner

MULTI-GRANULAR STREAM PROCESSING

BACKGROUND

This invention relates, in general, to facilitating processing within a computing environment, and in particular, to facilitating stream processing within the computing environment.

Currently, there are stream processing environments, in which a server is coupled to a stream cluster. The stream cluster includes one or more accelerators, which are used to increase the processing capabilities of the server. In particular, the accelerators are optimized to perform certain functions at higher speeds than if those functions were performed by the server.

Specifically, the server receives streams and extracts from the streams data and other information. That data/information is then sent from the server to the one or more accelerators for processing. When the accelerators complete processing, they forward the results to the server.

In such environments, the server has the responsibility of receiving the streams, extracting data or other information from the streams, forwarding the data/information to the accelerators, and receiving the results. Additionally, it performs other processing associated with the streams.

BRIEF SUMMARY

To improve efficiency of such systems, in accordance with an aspect of the present invention, the stream processing is distributed among a number of components of the computing environment. It is no longer the responsibility of the server to perform all of the coordination steps.

The shortcomings of the prior art are overcome and additional advantages are provided through the provision of a computer program product for facilitating stream processing in a computing environment. The computer program product comprises a storage medium readable by a processing circuit and storing instructions for execution by the processing circuit for performing a method. The method includes, for instance, obtaining, by a programmable unit, a description of one or more streams to be received by the programmable unit, the programmable unit programmed, at least in part, by a first component of the computing environment; receiving, by the programmable unit, the one or more streams; and processing by the programmable unit the one or more streams based on a type of the description obtained, wherein the processing includes at least one of: providing data relating to the one or more streams to the first component; performing one set of one or more operations for the one or more streams at the programmable unit; and forwarding information relating to the one or more streams to a second component of the computing environment to perform another set of one or more operations for the one or more streams.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, stream processing is facilitated in hybrid computing environments, as well as other environments. In one example of a hybrid computing environment, a programmable steering unit, such as an intelligent switch, is coupled to multiple components of the computing environment, including, for instance, a server and a stream cluster. The stream cluster includes one or more computing units, such as one or more accelerators.

The switch (or other programmable steering unit) receives streams from one or more sources and processes those streams based on descriptions received by either the sources or the server. In response to receiving one or more streams, the switch determines which operations of the streams are to be performed by the various components of the hybrid computing environment. For instance, the switch may determine that one set of one or more operations is to be performed by the switch itself and another set of one or more operations (e.g., the more compute intensive operations) is to be performed by the stream cluster. Further, in one or more embodiments, the switch sends descriptive data to the server, in response to receiving the streams and/or in response to the stream processing.

For example, the switch may perform intra-stream or inter-stream computation as bytes of a stream are received, e.g., sum, difference and convolution operations on streams. The stream cluster may compare video frames received in the first minute and 65th minute of a video surveillance stream input using complex image processing algorithms, for example. The switch performs stream operations that can be performed with line-speed of the incoming streams. Such operations usually require a modest memory footprint. The stream cluster performs operations that are compute and memory intensive requiring one or several passes of extracted stream data.

It also may require processing of data separated by periods of time. The switch can steer data so that the appropriate stream data reaches compute units of the stream cluster directly for high compute efficiency and performance. The stream cluster may host time-series databases that capture stream data over periods of time. The server features row-store and column-store databases that summarize and store streams, stream operations and other stream data aggregated over periods of time. Allowing multiple components of the multi-granular system operate on stream data at various granularities (fine-, medium- and coarse-grain) enables high efficiency and high performance.

Figure 1:
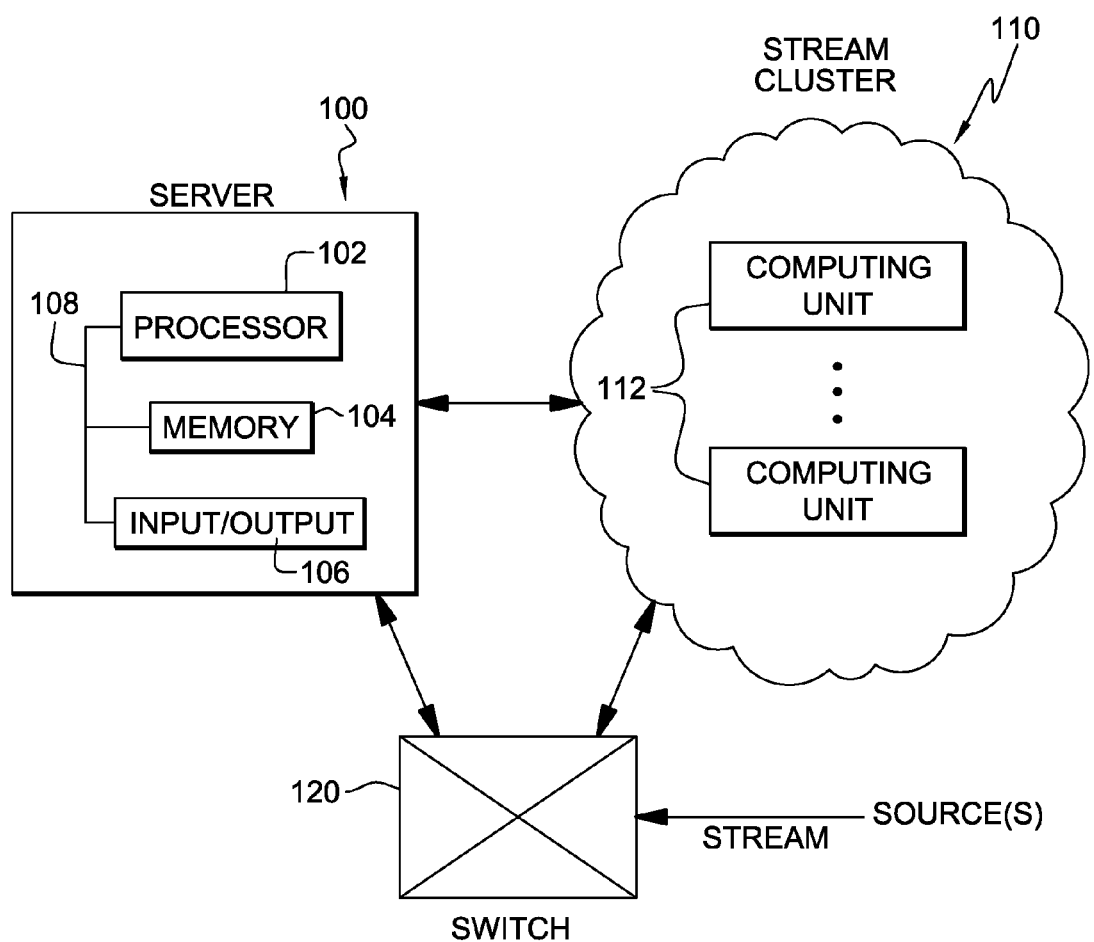
FIG. 1 depicts one example of a computing environment to incorporate and use one or more aspects of the present invention.

One embodiment of a computing environment to incorporate and use one or more aspects of the present invention is depicted in FIG. 1. In this example, a server 100 is coupled to a stream cluster 110. Server 100 includes, for instance, one or more processors 102, memory 104, and one or more input/output (I/O) devices or interfaces 106 coupled to one another via one or more buses 108. As examples, server 100 is a System p®, System x® or System z® server offered by International Business Machines Corporation (IBM®), Armonk, N.Y. IBM®, System p®, System x® and System z® are registered trademarks of International Business Machines Corporation, Armonk, N.Y. Other names used herein may be registered trademarks, trademarks or product names of International Business Machines Corporation or other companies.

In another embodiment, the server includes one or more partitions or zones. For example, the server is a logically partitioned System z® server based on the z/Architecture® offered by International Business Machines Corporation, Armonk, N.Y. The z/Architecture® is described in an IBM® publication entitled, "z/Architecture Principles of Operation," IBM Publication No. SA22-7832-07, February 2009, which is hereby incorporated herein by reference in its entirety. z/Architecture® is a registered trademark of International Business Machines Corporation, Armonk, N.Y.

In one example, stream cluster 110 includes one or more computing units 112. As examples, the computing units are hardware accelerators, such as blades in a blade center or chassis. Example accelerators include IBM® Cell BE blades; IBM® Datapower units; nVidia GPUs; and/or System p® or System x® blades, offered by International Business Machines Corporation. In a further example, the computing units are servers, such as System x®, System p® or System z® servers. Many other examples are also possible. The cluster may include a mix of different computing units, including a mix of different accelerator types.

In one example, server 100 communicates with stream cluster 110 via, for instance, a network, such as PCI Express, InfiniBand, Ethernet, etc. Further, server 100 and stream cluster 110 are coupled to at least one programmable steering unit, such as switch 120, via, for instance, InfiniBand or an Ethernet network. Switch 120 is, for instance, a server, such as a System x®, System p®, or System z® server, or a switch device offered by Cisco Systems, Inc. or International Business Machines Corporation, as examples. The switch receives streams from one or more sources, and processes those streams, as described herein.

In accordance with an aspect of the present invention, in order to facilitate stream processing, a number of data structures (e.g., tables) are used to maintain various information. These data structures include, for instance, a stream metadata table and a stream composite table, each of which is described below.

Figure 2A:
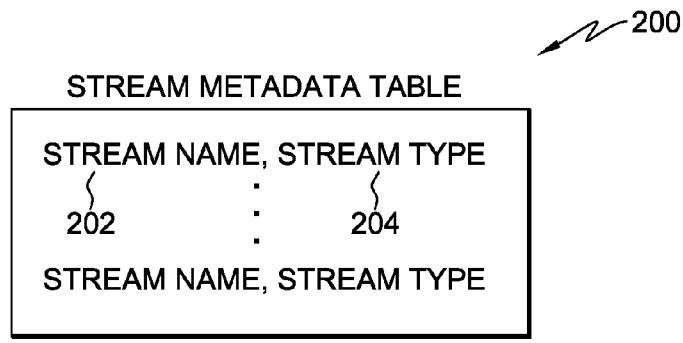
FIG. 2A depicts one embodiment of a stream metadata data structure used in accordance with an aspect of the present invention.

In one example, the stream metadata table is maintained by the server. Referring to FIG. 2A, a stream metadata table 200 includes, for instance, one or more entries, and each entry includes a stream name 202 identifying a stream, and a stream type 204 indicating the type of stream (e.g., video, audio, data, etc.).

Figure 2B:
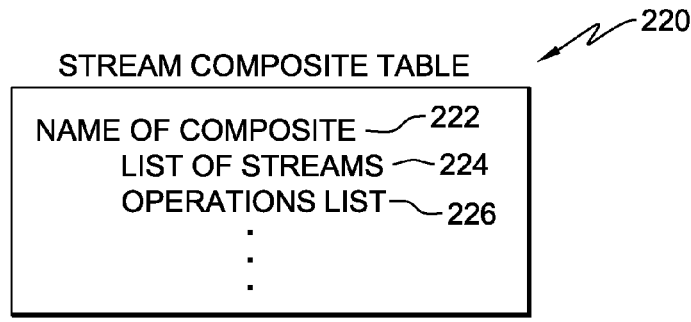
FIG. 2B depicts one example of a stream composite data structure used in accordance with an aspect of the present invention.

In addition to the stream metadata table, the server maintains a stream composite table, an example of which is depicted in FIG. 2B. A stream composite table 220 includes a name of a composite of streams 222 that are to be processed together, a list of streams in the composite 224, and an operations list 226, which indicates operations to be performed for the listed streams.

In addition to the above data structures, in one or more examples, processing is facilitated by the use of a summary record and/or a workload stream processing directive, each of which is described below.

Figure 3A:
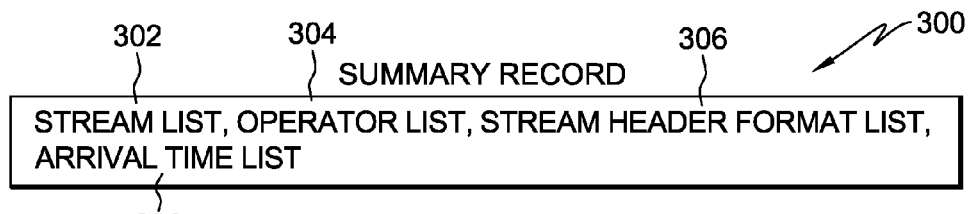
FIG. 3A depicts one example of a summary record used in accordance with an aspect of the present invention.

Referring to FIG. 3A, a summary record 300 includes, for instance, a stream list 302 that includes a list of streams to be processed together; an operator list 304 that specifies the operations to be performed on the list of streams; a stream header format list 306 that indicates the format of each stream in the list; and an arrival time list 308 that specifies the arrival time of each stream in the list. The arrival times are relative to one another. For instance, a summary record may include: S1, S2; extract (S1+S2, object); Format1, Format2; 0, 7, in which the streams are S1 and S2; the operations are extract and aggregate (+), in which S1 and S2 are aggregated and a specified object is extracted therefrom; the formats are Format1 and Format2 (e.g., MPEG, High Definition, etc.); and 0 and 7 are relative arrival times. The definition for each operation depends on the type of streams. For instance, if the streams are video, then the + may be defined as an aggregate, but if the streams are data, then the + may be defined as an addition operator. Many other examples are possible.

Figure 3B:
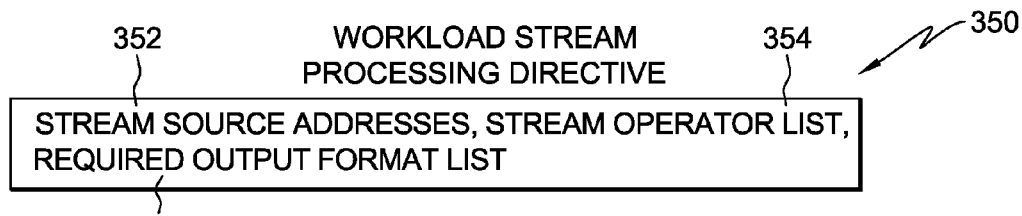
FIG. 3B depicts one example of a format of a workload stream processing directive used in accordance with an aspect of the present invention.

One embodiment of a format of a workload stream processing directive is described with reference to FIG. 3B. A workload stream processing directive 350 includes one or more stream source addresses 352 indicating the sources from which the streams are to arrive; a stream operator list 354 indicating the operations of those streams to be performed; and a required output format list 356 describing the desired format of the output from the streams.

The summary records and/or workload stream processing directives are used, in accordance with an aspect of the present invention, to describe the incoming streams to be processed. In the embodiments described herein, this descriptive information is provided to the programmable steering unit, which uses this information to process the streams indicated in the descriptive information. The programmable steering unit, in these embodiments, is a switch, which has intelligence (e.g., compute and packet processing logic). In one embodiment, the switch is programmed by the server based on the streams to be processed. The server programs the switch, so that the switch can make certain decisions regarding processing of the streams, in response to receiving the streams. Although the switch is provided as one example, other components may be used as programmable steering units.

The switch receives the descriptive information and one or more streams, and processes the streams based on a format of the descriptive information. For instance, processing of the streams is based on whether a summary record is used to describe the streams or the workload directive. In response to receiving the streams, the switch determines which operations are to be performed and which components (e.g., switch, stream cluster and/or server) of the computing environment are to perform the operations. For instance, in one particular embodiment, the cluster performs compute intensive operations (as defined by the system, in one example), and the switch itself performs less compute intensive operations. This allows the stream processing to be distributed among the various components of the computing environment, as described in further detail with reference to FIGS. 4-6.

Figure 4:
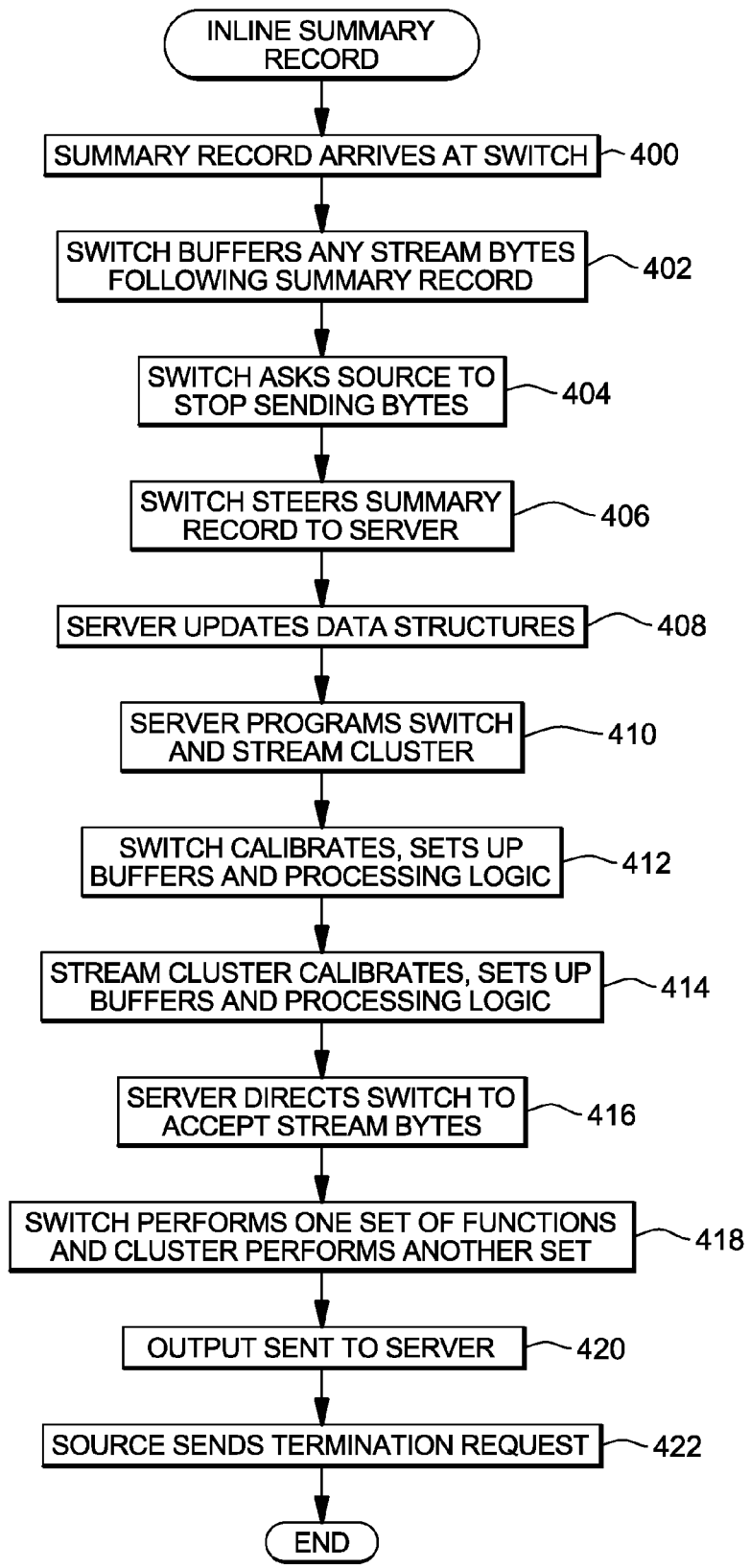
FIG. 4 depicts one embodiment of the logic to perform stream processing based on inline summary records, in accordance with an aspect of the present invention.
Figure 5:
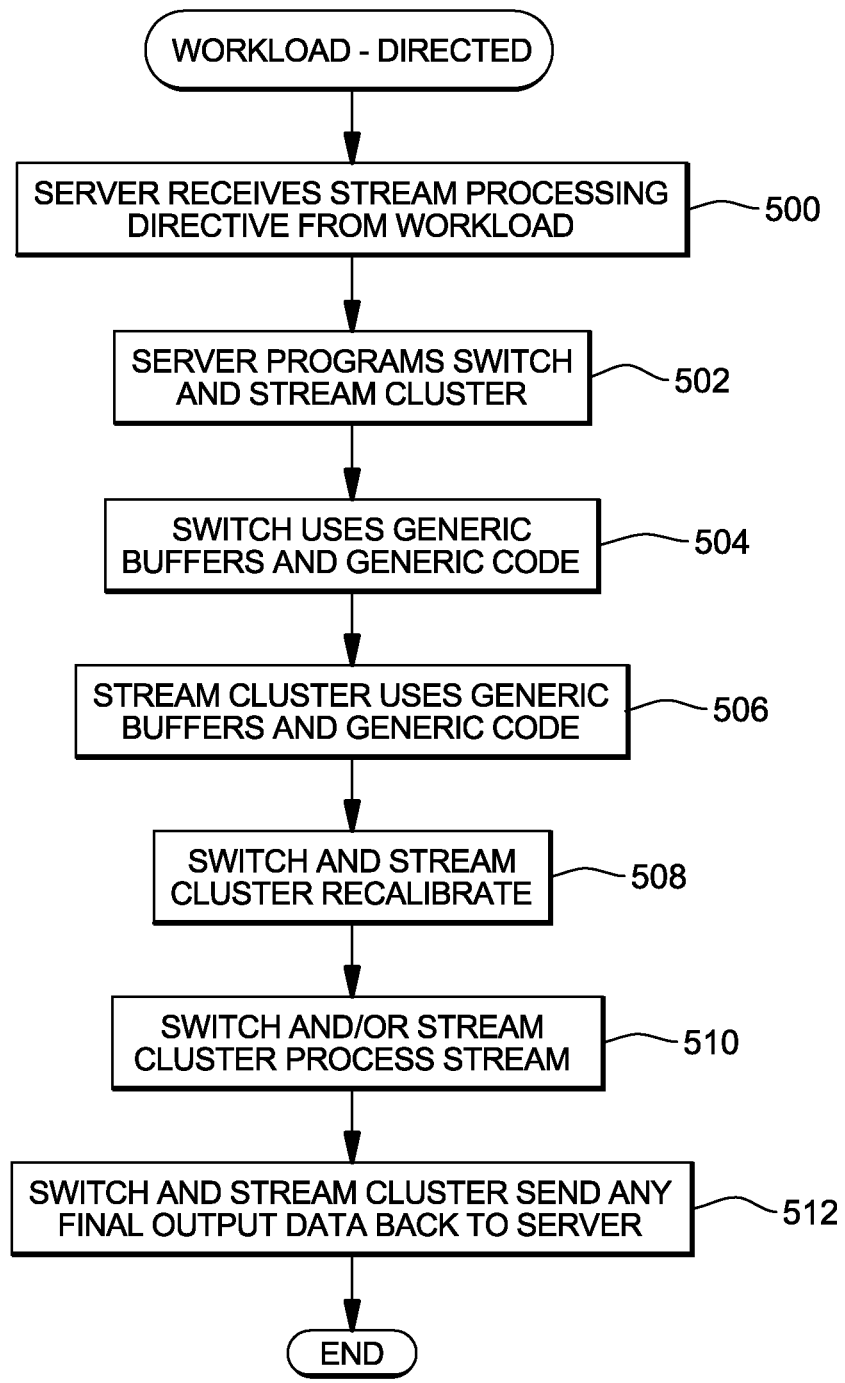
FIG. 5 depicts one embodiment of the logic to perform stream processing based on workload directives, in accordance with an aspect of the present invention.
Figure 6:
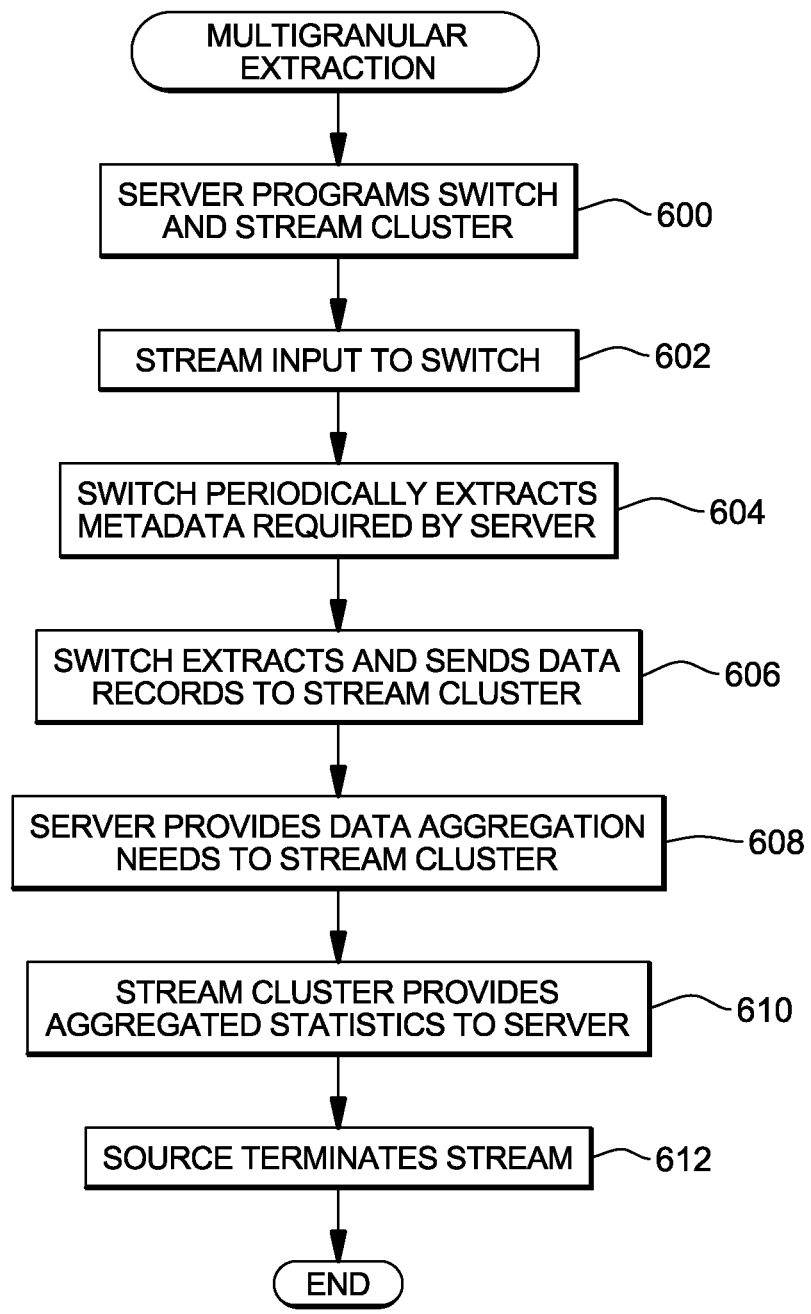
FIG. 6 depicts one embodiment of the logic to perform stream processing based on multi-granular extraction, in accordance with an aspect of the present invention.

Specifically, FIG. 4 depicts one embodiment of stream processing in which a summary record is received; FIG. 5 depicts one embodiment of stream processing in which a workload directive is used; and FIG. 6 depicts one embodiment of stream processing in which either a summary record or a workload directive is used and statistical information is to be provided to the server. Although these examples are provided, many other examples may be described. Further, revisions may be made to these examples without departing from the spirit of the present invention.

In the example of FIG. 4, a summary record is used that includes the following fields, as described above: S1, S2; extract (S1+S2, object); Format1, Format2; 0, 7. The arrival times are nearly the same (i.e., there is enough memory to buffer both), so the server can request that S1+S2 be executed on the switch. The extract operation will execute on the stream cluster. If, however, the arrival times were far enough apart that there would not be enough memory on the switch to buffer the streams and perform other work, then the server would be used as a backing store and the stream cluster would perform the + operation, rather than the switch. Other examples are also possible.

Referring to FIG. 4, a summary record arrives at the switch from one or more sources coupled to the switch, STEP 400. A source may be a video recorder, a computer, a device to provide financial market data, or any other device that is capable of providing streams. The summary record may be created by processing on those sources or by a user of those sources, as examples.

In response to receiving the summary record, the switch buffers any stream bytes following the summary record up to a predefined buffer amount, STEP 402. Further, it may request that the source stop sending bytes via, for instance, a pause message, until the multi-granular system is set-up, STEP 404. This happens, for instance, if the switch and server backing store run out of memory resources. This set-up includes the steps described below (e.g., STEPs 406-416).

The switch steers the summary record to the server, STEP 406, and the server updates the stream metadata and composite tables, STEP 408. For instance, in response to receiving the summary record, the server adds entries to the stream metadata table, each of which includes the name of the stream and the type of stream. For instance, for the particular example summary record described herein, an entry is added to the table for S1 and S2. Further, the server uses the summary record to add an entry to the stream composite table that includes a name of the composite (e.g., S1+S2), the list of streams for that composite (e.g., S1 and S2), and the operations list (e.g., +, extract).

Additionally, in response to receiving the summary record, the server programs the switch and one or more computing units of the stream cluster to perform the operations of the streams, STEP 410. In particular, the server uses predefined rules or heuristics to determine which operations specified in the summary record are to be performed by the switch and which operations are to be performed by the cluster. The server then provides the appropriate processing logic to the switch and cluster to enable them to perform their operations. For instance, the server stores a list of operations to be performed by the switch and which operations are more efficient on the stream cluster. The server may provide identifiers to activate processing code on the switch and stream cluster relevant to the operations. It can also provide processing code directly to the switch or stream cluster if such codes are not present in the switch or stream cluster.

Based on the information provided by the server, the switch calibrates itself and sets up its buffers and processing logic, STEP 412. This includes, for instance, sizing the buffers to the appropriate size for the streams and operations to be performed by the switch, and placing the processing logic received from the server in either hardware (e.g., field programmable gate arrays) or software (at a processor of the switch). Further, the stream cluster (i.e., one or more computing units of the cluster) also calibrates itself, and sets up its buffers and processing logic similar to that of the switch, STEP 414.

The server may then direct the switch to accept stream bytes, since the multi-granular system set-up is now complete, STEP 416. This occurs, for instance, if the switch ran out of memory resource and had to send flow-control messages to the stream sources. Responsive thereto, the switch sends a message to the one or more sources that it is now accepting stream data. The switch receives stream bytes from one or more sources and determines which operations it is to perform, if any, and which operations are to be performed by the stream cluster, as directed by the server. The switch performs the operations that it is to perform, and forwards the streams or necessary data to the stream cluster, so that the stream cluster can perform its operations, STEP 418. For instance, the switch performs the + operation on S1 and S2, and forwards that result to one or more computing units of the stream cluster, which performs the object extract (e.g., extract all vehicles from a video surveillance stream). The resulting outputs are then forwarded to the server, STEP 420. In one example, the cluster sends the resulting output to the server. In other examples, the switch and/or cluster send output, depending on the operations to be performed and the requests to the server.

At least one source sends a termination request to the switch, STEP 422. In response to this request, the switch propagates the termination request to both the server and the stream cluster, so that each of those components can save their state relating to the stream processing. This completes processing.

In a further example, a summary record is not used, but instead, workload on the server instructs the server regarding the streams to be received from different sources. The workload does not know the format of the streams, but does know what data it needs to be extracted from the streams. The workload provides this information in a workload directive, which is provided to the server. One embodiment of the logic to perform this processing is described with reference to FIG. 5.

Initially, the server receives a stream processing directive from the workload, STEP 500. This directive includes the source addresses for one or more streams, the operations to be performed for the one or more streams, and the desired output format, as examples. Based on this information, the server programs the switch and the stream cluster, STEP 502, similar to described above. For instance, the server provides the switch and one or more computing units of the cluster the logic to perform their specified operations. Since the format of the streams is not known at this point, the switch uses general-purpose buffers and general-purpose code to initially receive the streams, STEP 504. Similarly, the stream cluster uses general-purpose buffers and general-purpose code in its initial processing of the one or more streams, STEP 506. The general-purpose buffers and general-purpose code view incoming streams as a sequence of bytes. Buffers and code are instantiated that view a stream as a byte sequence.

However, in response to receiving a stream, and in particular, enough of the stream to determine its characteristics, the switch recalibrates, STEP 508. Recalibration is a process by which stream-specific buffers and processing code are used to enhance performance efficiency. For instance, the switch determines an appropriate buffer size for the input stream and the operations it is designated to perform, and resizes the generic buffer to fit the appropriate size. Further, it instantiates processing logic appropriate to the streams and operations to be performed. For example, the switch performs deep packet inspection on the stream to determine the data format of the stream along with relevant QoS (quality of service) parameters. After determining the data format, it instantiates processing code relevant to data (numeric, alphanumeric) or video (high-definition, mpeg, raw) or audio (different compression/encoding schemes), as examples. Other formats are also possible. It then sizes buffers based on quality of service requirements, like jitter and delay. The cluster similarly performs recalibration based on the stream data (e.g., streams, stream output, other data) it receives from the switch.

The switch and stream cluster then process the stream as indicated by the server, STEP 510. For example, the switch determines the operations it is to perform (e.g., +), performs those operations, and sends the output to the stream cluster. The stream cluster then performs its designated operations (e.g., extract). The results are then sent to the server by the stream cluster and/or switch depending on the operations to be performed and the output desired by the server, STEP 512.

In addition to the above, an example is provided in which the summary record or workload directive may be used. In this example, the server requests aggregation data. One embodiment of this logic is described with reference to FIG. 6. Initially, the server programs the switch and the stream cluster, such that each component can perform one or more operations to provide the requested aggregation data to the server, STEP 600. This programming is based, for instance, on a summary record or workload directive received by the server.

At least one stream is input to the switch from one or more sources, STEP 602. The switch periodically (as defined by the system) extracts metadata desired by the server and sends that metadata to the server, STEP 604. The metadata includes, for instance, coarse-grained data, such as type and number of objects in a video stream. The finer-grained features of the objects, however, could be processed by the stream cluster, instead of the switch, in one example. The switch can use the server as a backing store for any extended memory requirement.

Moreover, the switch extracts and sends data records to the stream cluster, STEP 606. A data record is, for instance, a collection of data groups, and each data group is, for instance, a collection of bits or bytes of stream data. The stream cluster will process this data to provide the requested statistics to the server, based on the aggregation characteristics provided by the server.

The server provides the data aggregation characteristics to the stream cluster based on the metadata received or other server analytical processing requirements, STEP 608. Responsive thereto, the stream cluster aggregates the data (based on specified operations and/or rules) and provides aggregated statistics to the server, as requested, STEP 610. In other examples, other statistical operations or analytics processing may be performed.

A source terminates one or more streams, STEP 612. This concludes processing.

Described in detail above is a capability for facilitating stream processing by distributing stream processing functionality among the various components of the computing environment. For instance, the switch receives the stream and has intelligence to parse the stream, send information to the server, perform certain operations itself, and/or send operations to the stream cluster to be performed. High level descriptions of the one or more streams to be received at the switch are either provided by the one or more sources in summary records or by the server in workload directives.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
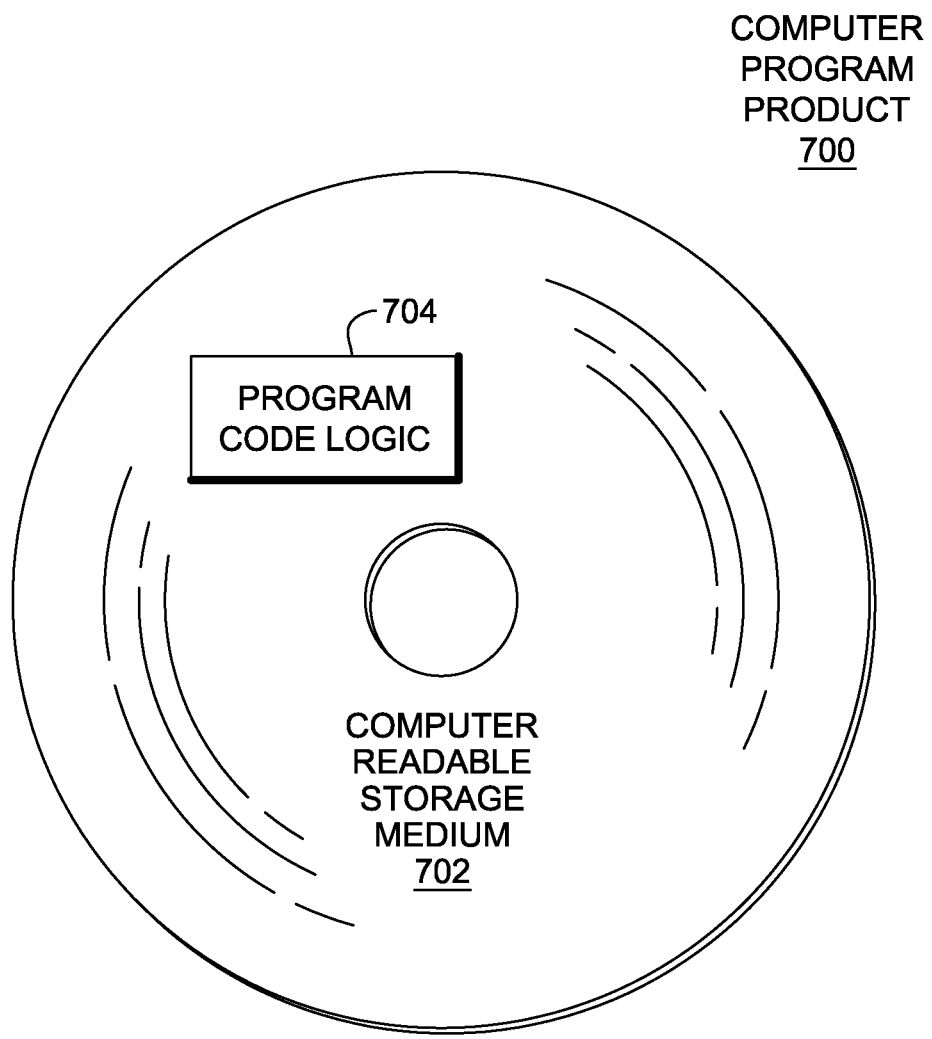
FIG. 7 depicts one embodiment of a computer program product incorporating one or more aspects of the present invention.

Referring now to FIG. 7, in one example, a computer program product 700 includes, for instance, one or more computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention, and/or different types of servers, accelerators or other computing units, and/or switches or other programmable steering units may be used. Additionally, the information provided in the various data structures and/or records or directives may be different than provided herein. Further, structures other than summary records and directives may be used. Other examples are also possible. Many other revisions may be made without departing from the spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating stream processing in a computing environment, said computer program product comprising:
a non-transitory computer readable storage medium readable by a processing circuit and storing instructions for execution by the processing circuit for performing a method comprising:
obtaining, by a programmable unit, a description of one or more streams to be received by the programmable unit from at least one source of the one or more streams, the description indicating a plurality of operations to be performed on content of the one or more streams to be received by the programmable unit;
receiving, by the programmable unit, from a first component of the computing environment, different from the at least one source of the one or more streams, data to program, based at least in part on the description of the one or more streams, the programmable unit to recognize one set of one or more operations, of the plurality of operations, determined by the first component to be performed by the programmable unit, and to recognize another set of one or more operations, of the plurality of operations, determined by the first component to be performed by a second component of the computing environment;
receiving, by the programmable unit, the one or more streams from the at least one source; and
processing by the programmable unit the one or more streams, wherein the processing includes:
performing the one set of one or more operations for the one or more streams at the programmable unit to obtain at least one result of performing the one set of one or more operations; and
performing at least one of:
forwarding one or more results of the at least one result to the second component for use in performing the another set of one or more operations by the second component; or
forwarding one or more results of the at least one result to the first component.

2. The computer program product of claim 1, wherein the obtaining comprises receiving a summary record from at least one source of the one or more streams, the summary record including one or more characteristics of the one or more streams.

3. The computer program product of claim 2, wherein the first component comprises a server coupled to the programmable unit, and wherein the method further comprises the programmable unit providing the summary record to the server.

4. The computer program product of claim 3, wherein the method further comprises updating by the server one or more stream data structures, in response to receiving the summary record.

5. The computer program product of claim 1, wherein the obtaining comprises receiving a workload directive from the first component, the workload directive describing one or more characteristics relating to the one or more streams.

6. The computer program product of claim 1, wherein the processing further comprises determining by the programmable unit, based on the received data to program the programmable unit, the one set of operations to be performed by the programmable unit and the another set of operations to be performed by the second component.

7. The computer program product of claim 6, wherein the second component comprises one or more computing units of a stream cluster coupled to the programmable unit.

8. The computer program product of claim 7, wherein the one or more computing units comprise one or more accelerators.

9. The computer program product of claim 1, wherein the method further comprises providing output resulting from processing the one or more streams to the first component, wherein the provided output comprises the one or more results of the at least one result of performing the one set of one or more operations by the programmable unit and at least one result of performing the another set of one or more operations by the second component.

10. A computer system for facilitating stream processing in a computing environment, the computer system comprising:
a memory; and
a processor in communications with the memory, wherein the computer system is capable of performing a method, said method comprising:

obtaining, by a programmable unit, a description of one or more streams to be received by the programmable unit from at least one source of the one or more streams, the description indicating a plurality of operations to be performed on content of the one or more streams to be received by the programmable unit;

receiving, by the programmable unit, from a first component of the computing environment, different from the at least one source of the one or more streams, data to program, based at least in part on the description of the one or more streams, the programmable unit to recognize one set of one or more operations, of the plurality of operations, determined by the first component to be performed by the programmable unit, and to recognize another set of one or more operations, of the plurality of operations, determined by the first component to be performed by a second component of the computing environment;

receiving, by the programmable unit, the one or more streams from the at least one source; and processing by the programmable unit the one or more streams, wherein the processing includes:
  performing the one set of one or more operations for the one or more streams at the programmable unit to obtain at least one result of performing the one set of one or more operations; and
  performing at least one of:
    forwarding one or more results of the at least one result to the second component for user in performing the another set of one or more operations by the second component; or
    forwarding one or more results of the at least one result to the first component.

11. The computer system of claim 10, wherein the obtaining comprises at least one of receiving a summary record from at least one source of the one or more streams, the summary record including one or more characteristics of the one or more streams or receiving a workload directive from the first component, the workload directive describing one or more characteristics relating to the one or more streams.

12. The computer system of claim 10, wherein the processing further comprises determining by the programmable unit, based on the received data to program the programmable unit, the one set of operations to be performed by the programmable unit and the another set of operations to be performed by the second component.

13. A method of facilitating stream processing in a computing environment, said method comprising:
  obtaining, by a programmable unit, a description of one or more streams to be received by the programmable unit from at least one source of the one or more streams, the description indicating a plurality of operations to be performed on content of the one or more streams to be received by the programmable unit;
  receiving, by the programmable unit, from a first component of the computing environment, different from the at least one source of the one or more streams, data to program, based at least in part on the description of the one or more streams, the programmable unit to recognize one set of one or more operations, of the plurality of operations, determined by the first component to be performed by the programmable unit, and to recognize another set of one or more operations, of the plurality of operations, determined by the first component to be performed by a second component of the computing environment;
  receiving, by the programmable unit, the one or more streams from the at least one source; and
  processing by the programmable unit the one or more streams, wherein the processing includes:
    performing the one set of one or more operations for the one or more streams at the programmable unit to obtain at least one result of performing the one or more operations; and
    performing at least one of:
      forwarding one or more results of the at least one result to the second component for use in performing the another set of one or more operations by the second component; or
      forwarding one or more results of the at least one result to the first component.

14. The method of claim 13, wherein the obtaining comprises at least one of receiving a summary record from at least one source of the one or more streams, the summary record including one or more characteristics of the one or more streams or receiving a workload directive from the first component, the workload directive describing one or more characteristics relating to the one or more streams.

15. The computer program product of claim 1, wherein the programmable unit is programmed by the first component identifying, via the received data, processing logic for the programmable unit, to enable the programmable unit to process the one or more streams.

16. The computer program product of claim 1, wherein the one or more streams comprise the description of the one or more streams, and wherein the programmable unit obtains the description of the one or more streams with receipt of the one or more streams.

17. The computer program product of claim 1, wherein, responsive to a source of the description of the one or more streams comprising the at least one source of the one or more streams, the processing the one or more streams comprises:
  providing data relating to the one or more streams to the first component;
  performing at the programmable unit the one set of one or more operations, the one set of one or more operations recognized by the programmable unit as being those operations which are to be performed by the programmable unit; and
  forwarding one or more results of the at least one result to the second component to facilitate performance of the another set of one or more operations at the second component, the another set of one or more operations recognized by the programmable unit as being those operations which are to be performed by the second component.

18. The computer program product of claim 1, wherein, responsive to a source of the description of the one or more streams being the first component, the first component being other than the at least one source of the one or more streams, the processing the one or more streams comprises:
  performing at the programmable unit the one set of one or more operations, the one set of one or more operations recognized by the programmable unit as being those operations which are to be performed by the programmable unit; and
  forwarding one or more results of the at least one result to the second component to facilitate performance of the another set of one of more operations at the second component, the another set of one or more operations recognized by the programmable unit as being those operations which are to be performed by the second component.

19. The computer program product of claim 1, wherein determination of the one set of one or more operations to be performed by the programmable unit and determination of the another set of one or more operations to be performed by the second component are based on levels of compute intensity of the respective one set of one or more operations and another set of one or more operations, wherein relatively less computationally-intensive operations are determined to be performed by the programmable unit and relatively more computationally-intensive operations are determined to be performed by the second component.

20. The computer program product of claim 1, wherein the at least one result of performing the one set of one or more operations by the programmable unit comprise multiple results, the multiple results comprising (i) at least one result of relatively coarse data granularity and (ii) at least one result of relative fine data granularity for further processing by the second component as part of the another set of one or more operations to be performed by the second component, and wherein processing the one or more streams by the programmable unit comprises forwarding the at least one result of relatively coarse data granularity to the first component and forwarding the at least one result of relatively fine data granularity to the second component for further processing by the another component in performing the another set of one or more operations.

* * * * *